United States Patent Office 3,520,886
Patented July 21, 1970

3,520,886
PYRIDAZONE/UREA DERIVATIVES
Franz Reicheneder, Ludwigshafen (Rhine) and Adolf Fischer, Mutterstadt, Pfalz, Germany, assignors to Badische Anilin- & Soda-Fabrik Aktiengesellschaft, Ludwigshafen (Rhine), Germany
No Drawing. Filed Dec. 9, 1966, Ser. No. 600,406
Claims priority, application Germany, Jan. 7, 1966,
B 85,307
Int. Cl. C07d 51/04
U.S. Cl. 260—250        2 Claims

ABSTRACT OF THE DISCLOSURE

Pyridazones having the formula

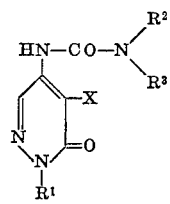

in which $R^1$ denotes a phenyl or cycloalkyl radical which may be substituted by alkyl or halogen or the trifluoromethyl radical, X denotes chlorine or bromine, $R^2$ denotes alkyl and $R^3$ denotes alkyl, alkoxyl or alkynyl or each of $R^2$ and $R^3$ denotes hydrogen or, in the event that X denotes bromine, $R^2$ in addition denotes hydrogen and $R^3$ in addition denotes a phenyl or chlorophenyl radical. The subject pyridazones have been found to have excellent herbicidal activity.

---

The present invention relates to new pyridazone. In particular it relates to new pyridazone/urea derivatives. The invention also relates to methods of controlling unwanted plants with said derivatives.

It is known that N-(1-phenyl-5-chloropyridazon-6-yl-4) N'-phenylurea may be used as the active ingredient of a herbicide (Canadian patent specification No. 704,740). It is also known that 2-chloro-4,6-bis-(ethylamino)-s-triazine may be used as the active ingredient of a total herbicide (U.S. patent specification No. 2,891,855). However their action is not satisfactory.

We have found that pyridazones having the formula

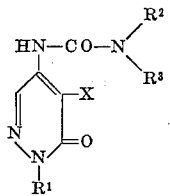

in which $R^1$ denotes a phenyl or cycloalkyl radical which may be substituted by alkyl or halogen or the trifluoromethyl radical, X denotes chlorine or bromine, $R^2$ denotes alkyl and $R^3$ denotes alkyl, alkoxyl or alkynyl or each of $R^2$ and $R^3$ denotes hydrogen or, in the event that X denotes bromine, $R^2$ in addition denotes hydrogen and $R^3$ in addition denotes a phenyl or chlorophenyl radical, have a good herbicidal action.

The pyridazones to be used according to the invention may be simply prepared by reacting the appropriate pyridazone substituted in 4-position by an isocyanato radical with an amine.

For example N-(1-cyclohexyl-5-chloropyridazon-6-yl-4) N'-dimethylurea may be obtained by reacting 1-cyclohexyl-4-isocyanato-5-chloropyridazone-(6) with dimethylamine.

Since all the other compounds to be used according to the invention may be prepared by analogous methods, the preparation of N-(1-cyclohexyl-5-chloropyridazon-6-yl-4) N'-dimethylurea will now be described in more detail:

70 parts (parts by weight) of 1-cyclohexyl-4-amino-5-chloropyridazone-(6) is suspended in 1000 parts of chlorobenzene and reacted with phosgene after HCl gas has been passed in. The mixture is heated to 130° C. and after two hours the solution which is now clear is evaporated down to ⅓ of its volume. After cooling, 65 parts of 1-cyclohexyl-4-isocyanato-5-chloropyridazone-(6) is obtained with a melting point of 121° to 123° C. (recrystallized from cyclohexane). 8 parts of this isocyanate is dissolved in 100 parts of benzene and about 5 parts of dimethylamine is pumped in. The clear solution is evaporated on a steam bath and cooled. 7 parts of N-(1-cyclohexyl-5-chloropyridazon-6-yl-4) N'-dimethylurea crystallizes out (melting point 150° to 151° C.).

The following compounds are examples of suitable agents for regulating plant growth according to this invention:

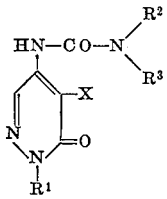

| $R^1$ | X | $R^2$ | $R^3$ | M.P. (° C.) |
|---|---|---|---|---|
| —⟨phenyl⟩ | —Cl | —CH₃ | —OCH₃ | 161–162 |
| —⟨phenyl⟩ | —Cl | —CH₃ | —CH₃ | 141–142 |
| —⟨phenyl⟩ | —Cl | —C₂H₅ | —C₂H₅ | 137–138 |
| —⟨phenyl⟩ | —Cl | —CH₃ | —CH(CH₃)C≡CH | 142–143 |
| —⟨phenyl⟩ | —Br | —CH₃ | —CH₃ | 142–143 |
| —⟨H-phenyl⟩ | —Cl | —CH₃ | —CH₃ | 150–151 |

The agents for regulating plant growth according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. Compounds having adequate basicity may be used as salts in aqueous solution even after formation of the salt with acids.

Dusts may be prepared by mixing or grinding the active ingredients with a solid carrier.

The following comparative experiments demonstrate the superiority of the compositions according to this invention over known active ingredients.

EXAMPLE 1

In a greenhouse plastics pots with a diameter of 8 cm. are filled with loamy sandy soil and seeds of beet (*Beta vulgaris*), Indian corn (*Zea mays*), peas (*Pisum sativum*), small nettle (*Urtica urens*), wild mustard (*Sinapis arvensis*), white goosefoot (*Chenopodium album*), common chickweed (*Stellaria media*) and annual meadow grass (*Poa annua*).

Then the soil prepared in this way is treated with 4 kg./ha. of N-(1-cyclohexyl - 5 - chloropyridazon-6-yl-4) N'-dimethylurea (I) and, for comparison, with 4 kg./ha. of N-(1-phenyl-5-chloropyridazon - 6 - yl-4) N'-phenylurea (II), each dispersed in 500 liters of water per hectare. Two to three weeks later the herbicidal action on small nettle (*Urtica urens*), wild mustard (*Sinapis arvensis*), white goosefoot (*Chenopodium album*), common chickweed (*Stellaria media*) and annual meadow grass (*Poa annua*) is observed to be stronger with I than II. The crop plants are damaged by neither of the active ingredients. After five weeks the unwanted plants have completely withered whereas beet (*Beta vulgaris*), Indian corn (*Zea mays*) and peas (*Pisum sativum*) continue to grow normally.

EXAMPLE 2

The plants beet (*Beta vulgaris*), barley (*Hordeum vulgare*), wheat (*Triticum vulgare*), wild mustard (*Sinapis arvensis*), white goosefoot (*Chenopodium album*), small nettle (*Urtica urens*) and annual meadow grass (*Poa annua*) are treated in a greenhouse at a growth height of 3 to 15 cm. with 4 kg./ha. of N-(1-cyclohexyl-5-chloropyridazon-6-yl-4) N'-dimethylurea (I) and, for comparison, with 4 kg./ha. of N-(1-phenyl - 5 - chloropyridazon-6-yl-4) N'-phenylurea (II), each dispersed in 500 liters of water per hectare. Three weeks later it can be observed that I exhibits a stronger herbicidal action on the unwanted plants and better compatibility with beet (*Beta vulgaris*), barley (*Hordeum vulgare*) and wheat (*Triticum vulgare*) than II. The herbicidal action can be seen from the following table:

|  | Active ingredient | |
|---|---|---|
|  | I | II |
| Crop plants: |  |  |
| Beet | 0 | 10–20 |
| Barley | 0 | 10–20 |
| Wheat | 10 | 20 |
| Unwanted plants: |  |  |
| Wild mustard | 90–100 | 80 |
| White goosefoot | 90 | 70 |
| Small nettle | 100 | 80 |
| Annual meadow grass | 90 | 70–80 |

0 = no damage.
100 = complete destruction.

EXAMPLE 3

An agricultural cultivated area is sown with wild mustard (*Sinapis arvensis*), white goosefoot (*Chenopodium album*), small nettle (*Urtica urens*) and annual meadow grass (*Poa annua*) and then treated with N-(1-cyclohexyl-5-chloropyridazon - 6 - yl - 4) N'-dimethylurea (I) and, for comparison, with 2-chloro-4,6-bis - (ethylamino)-s-triazine (II). In each case the rate of application is 5 kg./ha. of active ingredient dispersed in 500 liters of water per hectare. After the plants have emerged, it can be observed that the broadleaved and grass weeds treated with compound I exhibit greater damage than those treated with II. After four weeks almost all the plants are completely withered.

EXAMPLE 4

An agricultural area which is overgrown with wild mustard (*Sinapis arvensis*), white goosefoot (*Chenopodium album*), small nettle (*Urtica urens*) and annual meadow grass (*Poa annua*) is sprayed with N-(1-cyclohexyl-5-chloropyridazone - 6 - yl - 4) N'-dimethylurea (I) and, for comparison, with 2-chloro-4,6-bis-(ethylamino)-s-triazine (II). At the time of spraying the plants have a growth height of 3 to 9 cm. In each case the rate of application is 5 kg./ha. of active ingredient dispersed in 500 liters of water. A few days later it can be observed that the plants treated with compound I exhibit greater damage than those treated with compound II. After three weeks almost all the plants have completely withered.

The following have the same biological action as compound I in Examples 1, 2, 3 and 4:

N-(1-cyclohexyl-5-bromopyridazon-6-yl-4) N'-dimethylurea

N-(1-cyclopentyl-5-chloropyridazon-6-yl-4) N'-dimethylurea

N-(1-cyclooctyl-5-chloropyridazon-6-yl-4) urea

N-(1-p-methylcyclohexyl-5-chloropyridazon-6-yl-4) urea

N-(1-p-chlorophenyl-5-bromopyridazon-6-yl-4) N'-methyl-N'-butyn-(1)-yl-(3)-urea

N-(1-p-bromophenyl-5-bromopyridazon-6-yl-4) urea

N-(1-m-methylphenyl-5-chloropyridazon-6-yl-4) N'-methyl-N'-methoxyurea

N-(1-phenyl-5-bromopyridazon-6-yl-4) N'-phenylurea

N-(1-p-trifluoromethylphenyl-5-bromopyridazon-6-yl-4) N'-m,p-dichlorophenylurea

N-(1-phenyl-5-bromopyridazon-6-yl-4) N'-p-chlorophenylarea.

We claim:
1. N-(1-cyclohexyl - 5 - chloropyridazon - 6 - yl-4) N'-dimethylurea.
2. N-(1-phenyl - 5 - bromopyridazon - 6 - yl-4) N'-dimethylurea.

References Cited

UNITED STATES PATENTS 3,210,353  10/1965  Reicheneder et al. ____ 260—250
3,222,159  12/1965  Reicheneder et al. ____ 260—250

NICHOLAS S. RIZZO, Primary Examiner

U.S. Cl. X.R.

71—92